Feb. 7, 1967 — W. N. EDLICH — 3,302,474
VARIABLE SPEED POWER TRANSMISSION
Filed Dec. 21, 1964 — 2 Sheets-Sheet 1

INVENTOR.
WILLIAM N. EDLICH
BY
Herbert Smith Sylvester
ATTORNEY

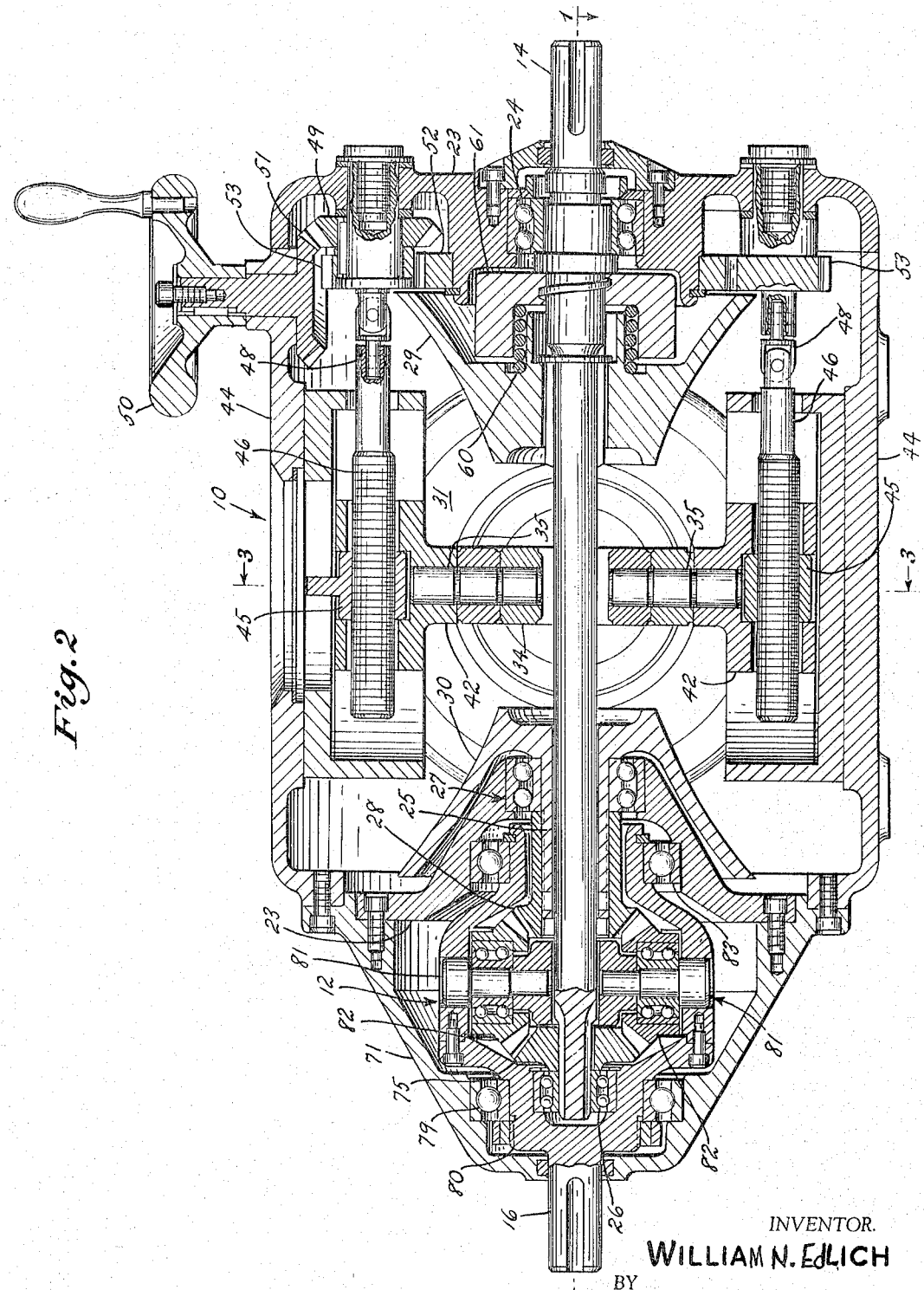

3,302,474
VARIABLE SPEED POWER TRANSMISSION
William N. Edlich, Union Hill, R.F.D. 1,
Dover, N.J. 07801
Filed Dec. 21, 1964, Ser. No. 419,716
7 Claims. (Cl. 74—200)

This invention relates to variables speed reversible power transmission mechanisms that can be used for numerous purposes, for example for industrial washing machine drives; for automotive devices such as automobiles, tractors, machine tools, and the like, where a change in speed of a driven unit relative to the engine or motor is required; or for industrial devices such as lathes, drill presses, boring mills and similar machines, where speed control and reversibility is desirable for different classes of work.

My invention especially contemplates an improved mechanism of this general character which embodies a pair of revoluble friction races or wheels whose peripheral surfaces are convexly contoured according to the tractrix or anti-friction curve and mate with laminated transmission discs which are journaled on spindles whose axes are angularly related to one plane and tiltable in another plane of the axis of said friction wheels and which have friction-surfaces which contact with the peripheral surfaces of said friction wheels such that relative shifting of said friction wheels and transmission discs will shift the zones of contact thereof and vary the relative speeds of rotation of said friction wheels, as disclosed in my United States Patent No. 2,353,448, dated July 11, 1944.

FIGURE 2 is a transverse vertical section or side elevation view on the line 2—2 of FIGURE 1 on an enlarged scale.

Figure 1:
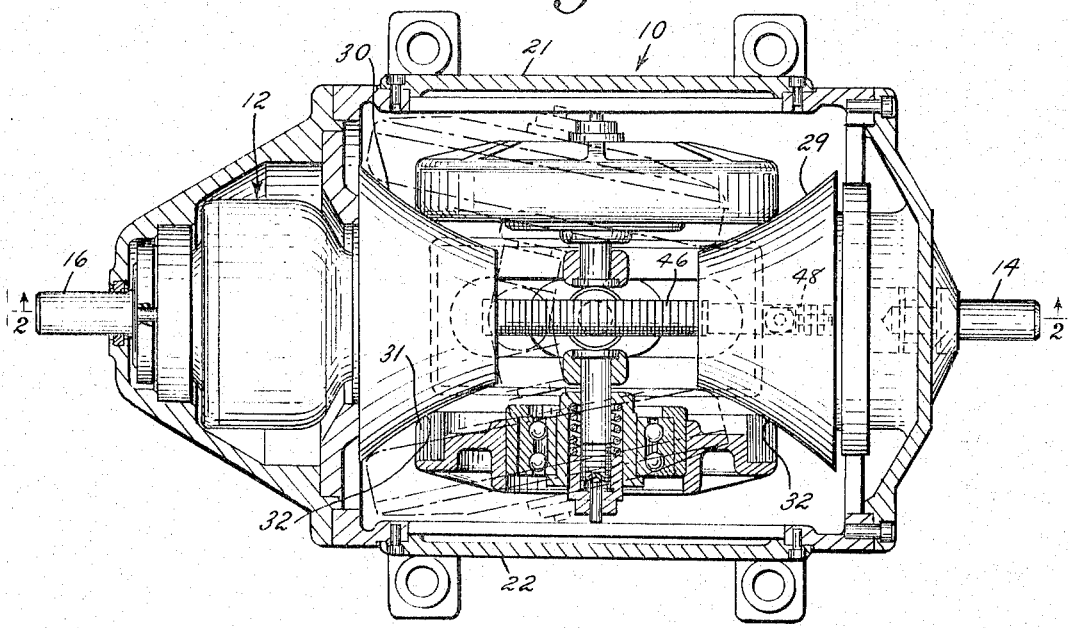
FIGURE 1 is a plan view partially broken away and in section through a variable speed power transmission mechanism embodying my invention.
Figure 3:
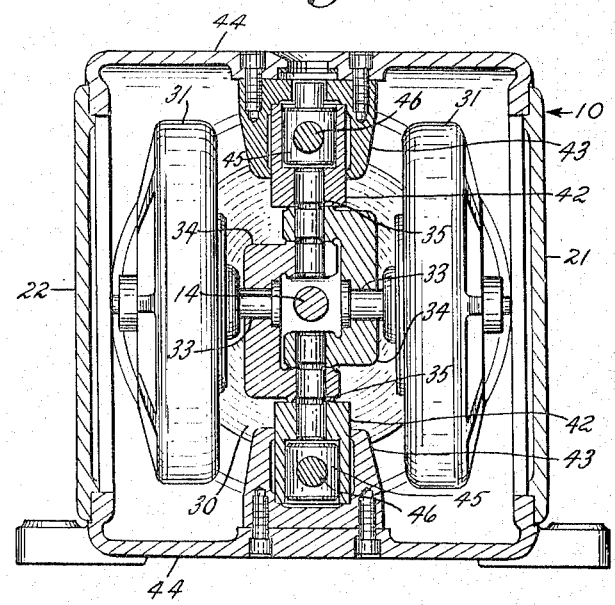
FIGURE 3 is a vertical sectional view of the device of FIGURE 2 on the line 3—3 thereof on the scale of FIGURE 1.

In the embodiment of the invention illustrated in FIGURES 1 to 3 inclusive, the reference character 10 designates generally a variable speed friction gearing and 12 designates generally a differential bevel gearing assembly, which are associated with each other to convert torque, i.e., transmit power and rotary motion at different speeds from an input drive shaft 14 to a driven or output shaft 16.

The variable speed friction gearing includes a frame, casing or support which comprises side walls 21 and 22, and end walls 23. The main input driving shaft 14 is journaled by a bearing 24 in one of the end walls 23 of the frame and has a tubular secondary shaft 25 which is telescopically disposed on its remote portion and is journaled in a bearing 26 at its other end. As shown, the secondary shaft 25 is supported at one end by a bearing 27 between its outer surface and the end wall 23 and at the other end by an integral ratio control bevel gear 28 so that said shafts may rotate relatively to each other.

A friction wheel 29 is keyed upon the main-input driving shaft 14 to rotate therewith, and a similar friction wheel 30 is integral with the secondary shaft 25 to rotate therewith. These friction wheels are spaced apart longitudinally of the main drive shaft and cooperate with transmission discs 31. The peripheral profile of each friction wheel is in the form of a concave curve, each wheel increasing in diameter in the direction longitudinal of the axis of the shaft from the inner to the outer end of the wheel, preferably conforming to the well known tractrix or anti-friction curve; and the transmission discs have circumferential friction surfaces 32 frictionally to contact the concave peripheries of the friction wheels.

Attention is particularly invited to the orientation of a laminar lining which provides the working surface of the transmission discs 31, as shown in FIGURE 1. The orientation of the laminate thereof coaxially with, or concentrically to, the shafts of the discs, i.e., with the edges of spirally wound lamellae rings substantially perpendicular to the faces of the friction wheels on which they bear, has been found to provide vastly superior operation with respect to lining life and quietness of operation, as distinguished from laminar linings disposed with the lamellae parallel to the principal plane of the discs.

Each of the friction discs 31 is rotatably mounted on a spindle 33 that is angularly related to one plane and tiltable in another plane of the axis of the main driving shaft 14. More particularly, each spindle is carried by a U-shaped offset yoke 34 which straddles the driving shaft 14 and has its arms pivotally connected to diametrically opposite trunnions 35 which are disposed on opposite sides of the main drive shaft 14. The spindles 33 are thus diametrically opposite each other and are tiltable about the axis of the trunnions 35 which is transverse of the axis or perpendicular to an axial plane of the main drive shaft 14 and preferably lies in an axial plane of that shaft.

With this construction it will be observed that the yokes 34 may be moved longitudinally of the shaft 14 so as to cause the spindles 33 to tilt and vary the positions of the points of contact of the friction surfaces 32 of the transmission discs with the peripheral friction surfaces of the friction wheels 29 and 30. The yokes 35 pivot and move longitudinally, and the spindles 33 are held against tilting in a direction circumferentially of the shaft 14 by guide blocks 42 and ways 43.

With this construction it will be observed that by adjusting the transmission discs 31 relatively to the friction wheels the speed of rotation of the driven friction wheel 30 may be varied.

Various means may be utilized for moving the trunnions 35 secured in guide blocks 42. In the instant embodiment these blocks are slidable in ways 43 that are located in the top and bottom walls 44 of the frame and are parallel to the shaft 14. The extremities of the trunnions 35 each project into respective slots in the bases of way members 45, and are engaged by internal threads with respective threaded shafts 46 each of which is driven through a universal joint 48 coupled to a bevel gear 49 and a driving gear 51 on a common shaft with a hand wheel 50 at the top of the device. A ring gear 52 couples toothed collars 53 adajcent the bevel gear 49 and causes them to rotate in the same direction so as to move the yokes 34 and trunnions 35 longitudinally of the shaft 14 on operation of the handwheel 50.

A compression spring 60 is interposed between the friction wheel 29 and a flywheel 61 so as normally to press the friction wheel into contact with the transmission discs. The flywheel is threaded to the shaft 14 and, on momentary overload, its inertial action causes it to advance along its thread to increase the pressure on the spring 60, thus transmitting a load to the friction wheel 29 and providing limited movement axially of the shaft 14 so that it may yield under the pressure exerted by the transmission discs 31. The torque responsive momentary overload driving action which is thus provided assists in smooth operation of the friction drive unit.

The differential gearing 12 is associated with the transmission of power at high speeds and high efficiency, the friction gearing 10 serving primarily to vary the speed, direction of rotation, and output torque of the driven shaft.

The differential bevel gearing assembly 12 includes a driving bevel gear 75 mounted on and rotatable with the main driving shaft 14. The secondary shaft 25 of the friction gearing carries an integral ratio control bevel gear 28 so that said gear 28 is rotatable by and with the secondary shaft 25. Preferably a bearing 79 is interposed between a frustoconical housing 71 for the differential assembly 12 and a bell 80 on the inner end of the driven or power take-off shaft 16.

The bell 80 on the end of the driven shaft 16 has a pair of pillar shafts 81 projecting laterally therefrom; and upon each is rotatably mounted a bevel gear 82 which meshes with both the driving bevel gear 75 and the ratio control bevel gear 28.

The bell 80 extends toward the variable speed friction gearing and tapers inwardly to receive a bearing 83 mounted in an end wall 23 of the friction gearing unit.

In the operation of the mechanism, the gear 75 is a constant speed gear, the speed of revolution of which depends upon the speed of rotation of the drive shaft 14, which may be connected to any prime mover. The transmission discs will be adjusted by manipulation of the handwheel 50 so as to vary the speed of the secondary shaft 25. This in turn will vary the speed of the control gear 28 of the differential bevel gearing assembly 12, and power and motion will be transmitted through the differential or planetary gears 82 directly from the driving gear 75 on the main driving shaft 14. The speed of the driven shaft 16 will depend upon the speed of rotation of the control gear 28. The faster the gear 28 rotates, the slower will be the rotation of the planetary gears 82 and the power take-off shaft 16 until the latter becomes still. As will be appreciated, the speed and direction of rotation of the power take-off shaft 16 is affected by the relative sizes of the drive gear 75 and the control gear 78 and the relative speeds at which they are driven.

The disposition of the control gear 28 in juxtaposition with and as an integral part of the driven friction wheel 30 provides a compact and highly efficient shortened structure.

Other modifications and changes in the details of structure of the mechanism will occur to those skilled in the art as within the spirit and scope of the invention.

What is claimed is:

1. A variable speed transmission comprising a driving shaft, a secondary shaft rotatable coaxially with and relatively to said driving shaft, a friction wheel on and rotatable with each said shaft and having a peripheral friction surface that varies in diameter axially of said shaft, and a rotatable transmission disc frictionally contacting said friction surfaces of said friction wheels so that said wheel on said secondary shaft is driven from the other wheel, the wheel-contacting surface of said disc being a laminate in which the edges of the lamellae are disposed substantially perpendicularly to the friction surfaces of said friction wheels on which said laminate bears.

2. A variable speed transmission comprising a driving shaft, a secondary shaft rotatable coaxially with and relatively to said driving shaft, a friction wheel on and rotatable with each said shaft and having a peripheral friction surface that varies in diameter axially of said shaft, a rotatable transmission disc frictionally contacting said friction surfaces of said friction wheels so that said wheel on said secondary shaft is driven from the other wheel, the wheel-contacting surface of said disc being a laminate in which the edges of the lamellae are disposed substantially perpendicularly to the friction surfaces of said friction wheels on which said laminate bears, and a differential gearing operatively connected between said driving shaft and said secondary shaft and disposed telescopically over one end of said driving shaft between the end thereof and said secondary shaft.

3. A variable speed transmission comprising a driving shaft, a secondary shaft rotatable coaxially with and relatively to said driving shaft, a friction wheel on and rotatable with each said shaft and having a peripheral friction surface that varies in diameter axially of said shaft, a rotatable transmission disc frictionally contacting said friction surfaces of said friction wheels so that said wheel on said secondary shaft is driven from the other wheel, the wheel-contacting surface of said disc being a laminate in which the edges of the lamellae are disposed substantially perpendicularly to the friction surfaces of said friction wheels on which said laminate bears, and a differential gearing operatively connected between said driving shaft and said secondary shaft and disposed telescopically over one end of said driving shaft between the end thereof and said secondary shaft, said secondary shaft, the friction wheel thereon, and the differential gearing member driven thereby, constituting an integral structure.

4. A variable speed transmission comprising a driving shaft, a secondary shaft rotatable coaxially with and relatively to said driving shaft, a friction wheel on and rotatable with each said shaft and having a peripheral surface that varies in diameter axially of said shaft, torque-responsive means for momentarily sliding one of said friction wheels toward the other on sudden loading of said transmission, and a rotatable transmission disc frictionally contacting said friction surfaces of said friction wheels so that said wheel on said secondary shaft is driven from the other wheel, the wheel-contacting surface of said disc being a laminate in which the edges of the lamellae are disposed substantially perpendicularly to the friction surfaces of said friction wheels on which said laminate bears.

5. A variable speed transmission comprising a driving shaft, a secondary shaft rotatable coaxially with and relatively to said driving shaft, a friction wheel on and rotatable with each such shaft and having a peripheral surface that varies in diameter axially of said shaft, a flywheel disposed on a helical thread on said driving shaft in juxtaposition to the friction wheel thereon, said friction wheel on said driving shaft being subject to limited axial motion thereof, a resilient member between said flywheel and said friction wheel, said friction wheel being slidably keyed to said driving shaft whereby on sudden loading of said transmission the inertial force of said flywheel causes it to advance along said helical thread to increase the pressure through said resilient member on said friction wheel thereby momentarily urging said friction wheel axially along said driving shaft toward said friction wheel on said secondary shaft, and a rotatable transmission disc frictionally contacting said friction surfaces of said friction wheels so that said wheel on said secondary shaft is driven from the other wheel, the wheel contacting surface of said disc being a laminate in which the edges of the lamellae are disposed substantially concentrically to the periphery surfaces of said disc.

6. A variable speed transmission comprising a driving shaft, a secondary shaft rotatable coaxially with and relatively to said driving shaft, a friction wheel on and rotatable with each said shaft and having a peripheral surface that varies in diameter axially of said shaft, torque-responsive means for momentarily sliding one of said friction wheels toward the other on sudden loading of said transmission, a rotatable transmission disc frictionally contacting said friction surfaces of said friction wheels so that said wheel on said secondary shaft is driven from the other wheel, the wheel-contacting surface of said disc being a laminate in which the edges of the lamellae are disposed substantially perpendicularly to the friction surfaces of said friction wheels on which said laminate bears, and a differential gearing operatively connected between said driving shaft and said secondary shaft and disposed telescopically over one end of said driving shaft between the end thereof and said secondary shaft.

7. A variable speed transmission comprising a driving shaft, a secondary shaft rotatable coaxially with and relatively to said driving shaft, a friction wheel on and rotatable with each such shaft and having a peripheral surface that varies in diameter axially of said shaft, a flywheel disposed on a helical thread on said driving shaft in juxtaposition to the friction wheel thereon, said friction wheel on said driving shaft being subject to limited axial motion thereof, a coil spring between said flywheel and said friction wheel slidably keyed to said driving shaft whereby on sudden loading of said transmission the inertial force of said flywheel causes it to advance along said helical thread and exert increased axial pressure through said spring on said friction wheel, thereby momentarily urging said friction wheel axially along said driving shaft toward said friction wheel on said secondary shaft, a rotatable transmission disc frictionally contacting said friction surfaces of said friction wheels so that said wheel on said secondary shaft is driven from the other wheel, the wheel contacting surface of said disc being a laminate in which the edges of the lamellae are disposed substantially perpendicularly to the friction surfaces of said friction wheels on which said laminate bears, and a differential gearing operatively connected between said driving shaft and said secondary shaft and disposed telescopically over one end of said driving shaft between the end thereof and said secondary shaft, said secondary shaft, the friction wheel thereon, and the differential gearing member driven thereby, constituting an integral structure which is immovable axially with respect to said driving shaft.

References Cited by the Examiner
UNITED STATES PATENTS

| | | | |
|---|---|---|---|
| 2,060,884 | 11/1936 | Madle | 74—200 X |
| 2,086,491 | 7/1937 | Dodge | 74—200 X |
| 2,132,801 | 10/1938 | Perruca | 74—208 X |
| 2,239,087 | 4/1941 | Erban | 74—208 |
| 2,716,357 | 8/1955 | Rennerfelt | 74—200 X |

DAVID J. WILLIAMOWSKY, *Primary Examiner.*

L. H. GERIN, *Assistant Examiner.*